April 15, 1930.  L. GUNDRUP  1,754,714
BRACKET
Filed Feb. 23, 1926
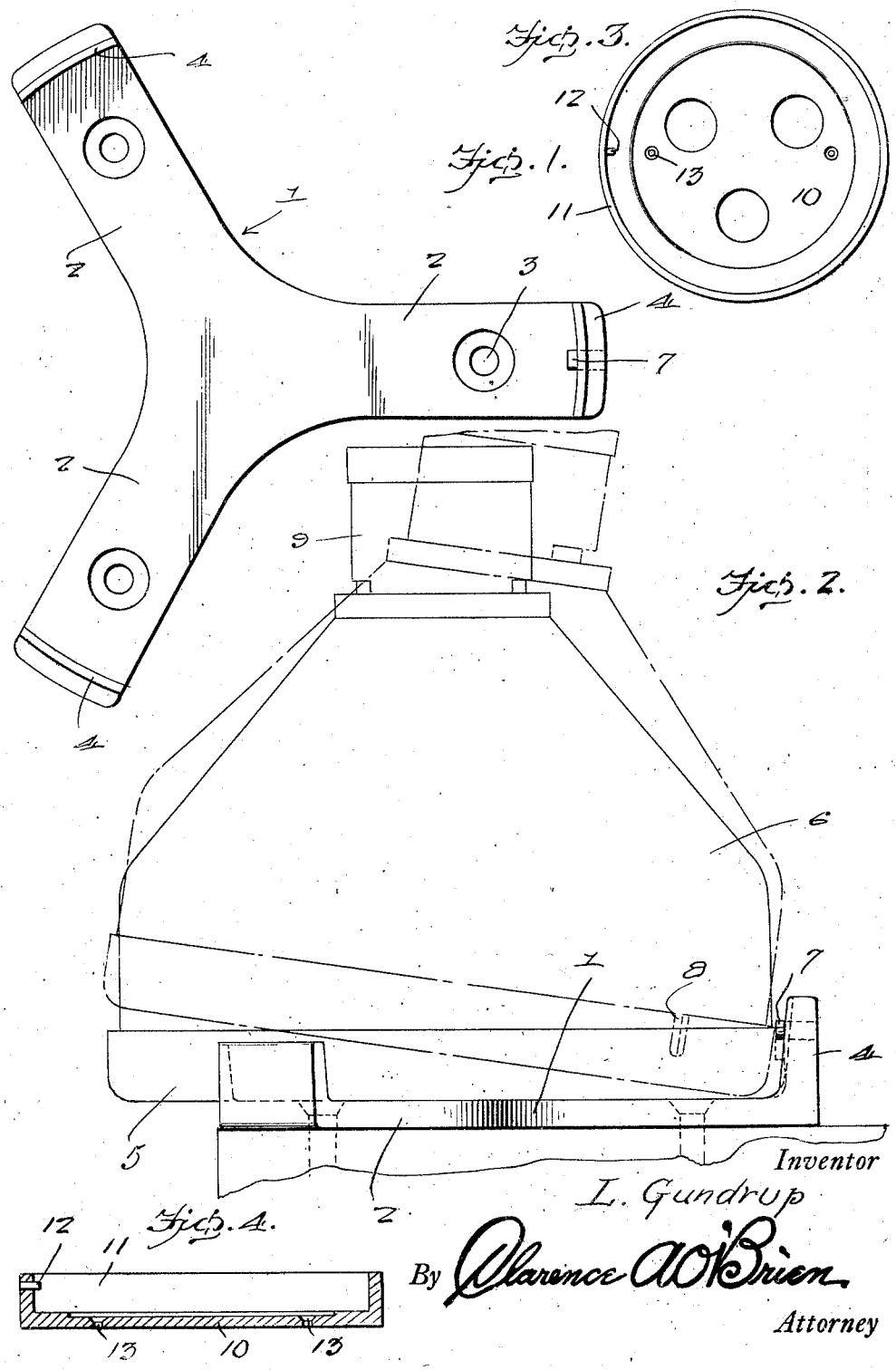
Inventor
L. Gundrup
By Clarence A. O'Brien
Attorney Patented Apr. 15, 1930

1,754,714

UNITED STATES PATENT OFFICE

LORENZ GUNDRUP, OF SPRINGFIELD, ILLINOIS

BRACKET

Application filed February 23, 1926. Serial No. 90,220.

The present invention relates to a highly novel, yet simple device for use in assembling and disassembling the skimming bowl of cream separators.

One of the important objects of the present invention is to provide a bracket which is of such construction as to provide a rigid and stationary support for the skimming bowl of a cream separator in order that parts thereof may be readily assembled or disassembled for cleaning purposes.

A further object is to provide a supporting bracket of the above mentioned character wherein the same includes a means for cooperation with the usual notches formed in the upstanding flange of the base of the skimming bowl of a cream separator whereby said bowl is secured on the bracket against slippage or rotation during the loosening or tightening of the nut at the upper end of the bowl.

A further object is to provide a supporting bracket of the above mentioned character which is simple in construction, inexpensive, strong, and durable, and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the several views:

Figure 1 is a top plan view of the bracket embodying my invention.

Figure 2 is a side elevation thereof showing a skimming bowl in the act of being placed on the bracket.

Figure 3 is a reduced plan view of a modification, and

Figure 4 is a sectional view therethrough.

In the drawing with reference more particularly to Figures 1 and 2, the numeral 1 designates generally my improved supporting bracket, the same being formed of any suitable material, and comprising the radially disposed arms 2. The bracket 1 is adapted to be secured on any suitable stationary support such as a table or the like and to this end I provide suitable openings 3 in the radially disposed arms for receiving any appropriate fastening means such as screws or the like. If desired, the bracket may be made to form a part of any well known type of cream separator.

An upwardly disposed ear or lug 4 is formed on the outer end of each of the radially disposed arms, and as is clearly shown in Figure 1, these ears or lugs are slightly curved so as to conform with the contour of the flange or rim 5 which extends around the base or larger end of the skimming bowl 6 which forms a part of a cream separator. As the skimming bowl may be of the conventional construction, and as the same forms no important part of the present invention, a detailed description thereof is not thought necessary.

As is more clearly shown in Figure 2 of the drawing, one of the upstanding ears or lugs 4 is of a greater height than the other ears or lugs. A pin 7 is arranged transversely in the longer ear or lug and the inner end thereof projects beyond the inner curved face of said ear for the purpose hereinafter to be more fully described.

In order that the skimming bowl of a cream separator may be disassembled for cleaning purposes, after the bowl has been removed from the separator machine, the bowl is placed on the bracket 2 in the manner as shown by the dotted lines in Figure 2 of the drawing, and when the base of the bowl rests on the bracket, so that the inner end of the pin is disposed in the upper end of the notch 8 which is formed in the rim or flange 5 and which encircles the lower end of the bowl, the other ears will fit against the rim, and the bowl will thus be supported in an upright rigid position on the bracket. The cooperating pin and notch will prevent the accidental rotation or slippage of the bowl while supported on the bracket.

The bowl nut which is arranged at the upper smaller end of the bowl is then permitted to be removed by the use of a wrench or any other suitable tool in an easy and efficient manner. In this way, the various parts of the skimming bowl may be readily and easily disassembled, and manifestly the parts of the skimming bowl may be assembled.

In Figures 3 and 4 of the drawing, a modification is shown wherein the bracket comprises a circular base plate 10 which is of a diameter slightly greater than the diameter of the rim or flange 5 which encircles the larger portion of the skimming bowl and extending upwardly from the circular base plate 10 at its perimeter is the annular rim 11. This rim 11 is adapted to engage the annular flange 5 and a transversely extending pin 12 similar to the pin 7 is associated with the rim 11 for cooperation with the notch 8 formed in the flange 5 in the same manner as does the pin 7 which is carried by one of the upstanding gears or lugs 4, and for the same purpose.

The circular base plate 10 is also provided with suitable openings 13 to receive appropriate fastening means whereby said bracket as embodied in the modified form may be rigidly secured either on a stationary support or on the cream separator.

While I have shown the preferred embodiment of my invention, it is to be understood that minor changes in the size, shape, and arrangement of parts may be resorted to without departing from the spirit of the invention and scope of the appended claim.

Having thus described the invention, what I claim as new and desire to secure by Letters Patent is:—

As a new article of manufacture, a bracket constructed from a single piece of metal and including a central portion, and a plurality of equi-distantly spaced arms extending radially from the central portion, the arms and the central portion all being disposed in the same horizontal plane, an upstanding ear formed on the outer end of each arm, the inner face of each ear being curved, one of the upstanding ears being of greater height than the other ears, and a stationary transverse pin extending inwardly from the longer ear and disposed in a plane above the upper edges of the other ears as and for the purpose described.

In testimony whereof I affix my signature.

LORENZ GUNDRUP.